United States Patent
Swanson et al.

(10) Patent No.: US 10,404,150 B2
(45) Date of Patent: Sep. 3, 2019

(54) LOW PROFILE KINETIC ENERGY HARVESTER

(71) Applicant: SPAWAR Systems Center Pacific, San Diego, CA (US)

(72) Inventors: Paul D. Swanson, Santee, CA (US); Brian B. Dick, San Diego, CA (US); Maxwell Kerber, San Diego, CA (US); Alex G. Phipps, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 294 days.

(21) Appl. No.: 15/405,191

(22) Filed: Jan. 12, 2017

(65) Prior Publication Data

US 2018/0198359 A1    Jul. 12, 2018

(51) Int. Cl.
*H02K 35/06* (2006.01)

(52) U.S. Cl.
CPC ..................... *H02K 35/06* (2013.01)

(58) Field of Classification Search
CPC ........................................................ H02K 35/06
USPC ............................................................ 310/15
See application file for complete search history.

(56) References Cited

U.S. PATENT DOCUMENTS

| | | | | |
|---|---|---|---|---|
| 2,436,354 A | * | 2/1948 | Burke | H01F 7/14 335/230 |
| 3,928,988 A | * | 12/1975 | Luth | D04B 15/58 335/234 |
| 4,367,449 A | * | 1/1983 | Veisz | H01H 51/01 335/229 |
| 4,727,344 A | * | 2/1988 | Koga | H01F 7/1646 335/229 |
| 4,881,054 A | * | 11/1989 | Polgar | H01H 51/2236 335/230 |
| 5,150,090 A | * | 9/1992 | Miura | H01H 51/2245 335/230 |
| 5,587,615 A | | 12/1996 | Murray et al. | |
| 7,692,340 B2 | | 4/2010 | Waters et al. | |
| 7,710,227 B2 | | 5/2010 | Schmidt | |
| 7,948,124 B1 | | 5/2011 | Waters et al. | |
| 9,240,267 B2 | | 1/2016 | Nagahara et al. | |
| 9,293,973 B2 | * | 3/2016 | Tsukanaka | H02K 35/06 |
| 2007/0135756 A1 | * | 6/2007 | Kohlbrenner | A61M 5/178 604/21 |
| 2011/0285487 A1 | * | 11/2011 | Schmidt | H02K 35/04 335/302 |
| 2013/0342032 A1 | * | 12/2013 | Laurent | H02K 35/04 310/17 |
| 2017/0141668 A1 | * | 5/2017 | Xing | H02K 35/06 |

* cited by examiner

*Primary Examiner* — Alex W Mok
(74) *Attorney, Agent, or Firm* — Naval Information Warfare Center, Pacific; Kyle Eppele

(57) ABSTRACT

An energy harvesting device includes a core portion, a first magnet, and a second magnet. The core portion has an electrical output and can move from a first disposition to a second disposition. The first magnet is disposed to provide first magnetic field lines therethrough in a first direction. The second magnet is disposed to provide second magnetic field lines therethrough in a second direction. The core portion, the first magnet and the second magnet are arranged such that externally applied vibrations in a third direction normal to the first direction cause the core portion to oscillate between the first disposition and the second disposition.

15 Claims, 10 Drawing Sheets

LOW PROFILE KINETIC ENERGY HARVESTER

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil. Reference Navy Case No. 102,671.

BACKGROUND

Embodiments of the invention relate to devices and methods to harvest energy resulting from vibrations.

There exists a need for the ability to harvest energy utilizing a low-profile device, enabling devices to be powered by passive motion and thus eliminate the need for traditional power sources, such as batteries that deplete and require replacement.

SUMMARY

Aspects of the present invention are drawn to an energy harvesting device that includes a core portion, a first magnet, and a second magnet. The core portion has an electrical output and can move from a first disposition to a second disposition. The first magnet is disposed to provide first magnetic field lines therethrough in a first direction. The second magnet is disposed to provide second magnetic field lines therethrough in a second direction. The core portion, the first magnet and the second magnet are arranged such that externally applied vibrations in a third direction normal to the first direction cause the core portion to oscillate between the first disposition and the second disposition. When traveling from the second disposition to the first disposition, the electrical output outputs a first current so as to have a first polarity based on magnetic field lines from a first portion of the first magnetic field lines and a first portion of the second magnetic field lines, wherein the first portion of the first magnetic field lines is greater than the first portion of the second magnetic field lines. When traveling from the first disposition to the second disposition, the electrical output outputs the first current so as to have a second polarity based on magnetic field lines from a second portion of the first magnetic field lines and a second portion of the second magnetic field lines, wherein the second portion of the first magnetic field lines being less than the second portion of the second magnetic field lines.

BRIEF SUMMARY OF THE DRAWINGS

The accompanying drawings, which are incorporated in and form a part of the specification, illustrate example embodiments and, together with the description, serve to explain the principles of the invention. In the drawings:

FIG. 1A illustrates a side view of an example energy harvesting device using a weighted bar, FIG. 1B illustrates a top view of an example energy harvesting device using a weighted bar, FIG. 1C illustrates a side view of an example energy harvesting device using a multitude of weights and FIG. 1D illustrates a top view of an example energy harvesting device using a multitude of weights;

FIG. 2A and FIG. 2B illustrate a side and top view, respectively, of an example energy harvesting device at a resting state, and FIG. 2C and FIG. 2D illustrate a side and top view, respectively, of an example energy harvesting device at a position rotated about the insulator;

FIG. 3A and FIG. 3B illustrate a side and top view, respectively, of an example energy harvesting device, and FIG. 3C and FIG. 3D illustrate a side and top view, respectively, of an example energy harvesting device at a position rotated about the insulator;

FIG. 4A illustrates the magnetic field as a function of angle of rotation and FIG. 4B illustrates the output current as a function of angle of rotation;

FIG. 5A illustrates a top view, and FIG. 5B illustrates an oblique view;

FIG. 6A illustrates a side view of an example energy harvesting device, and FIG. 6B illustrates a top view of an example energy harvesting device;

DETAILED DESCRIPTION

The present invention provides a device and method to harvest energy resulting from vibrations.

Aspects of the present invention will now be described with reference to FIGS. 1-8.

Specifics of two example energy harvesting devices will now be described with reference to FIGS. 1A-D.

Figure 1A:
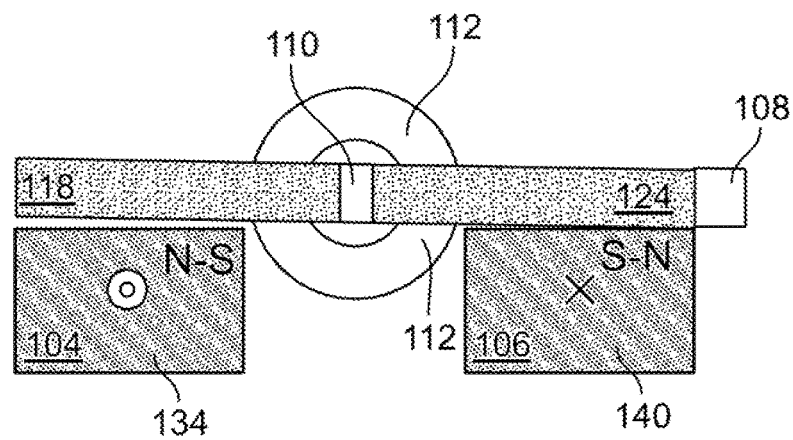
FIGS. 1A-D illustrate two example embodiments of energy harvesting devices, where
Figure 1B:
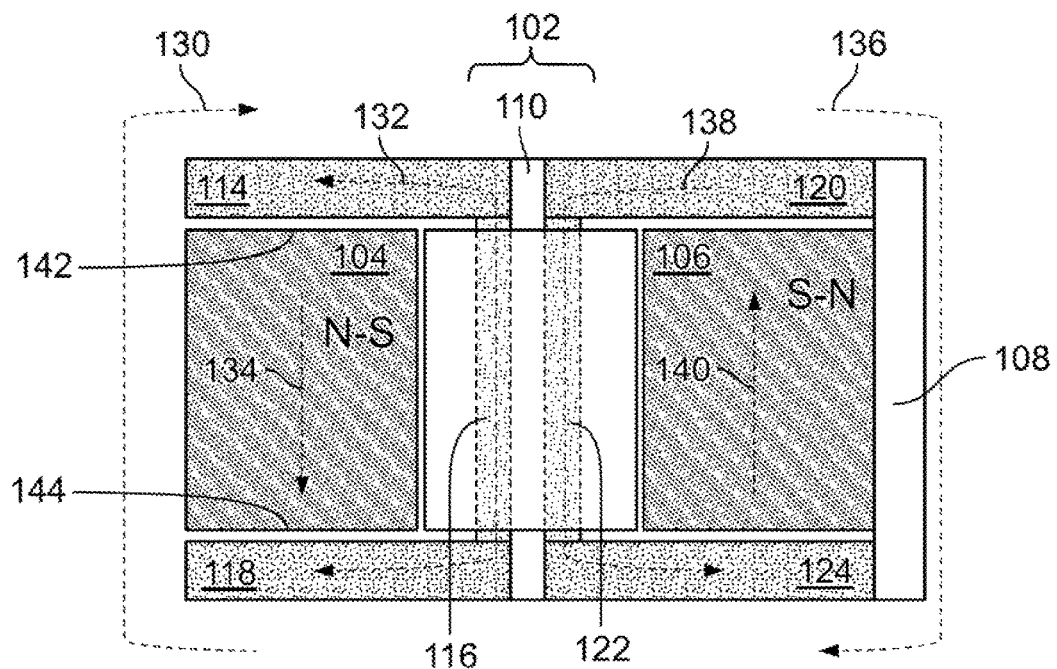
Figure 1C:
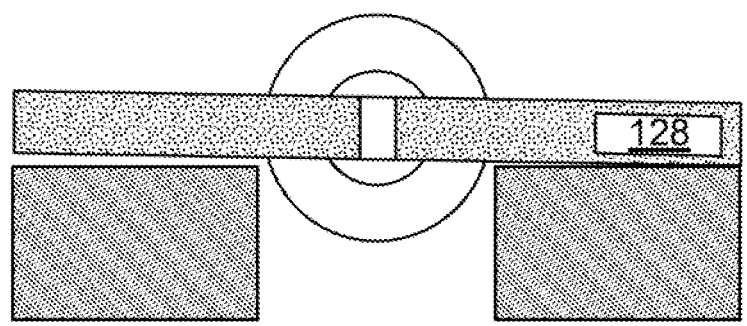
Figure 1D:
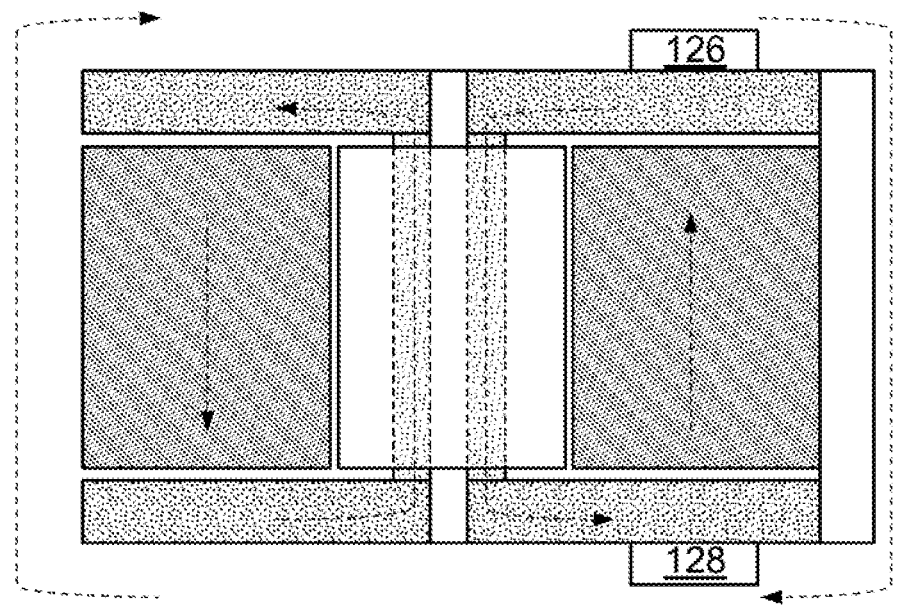

FIGS. 1A-D illustrate two example embodiments of energy harvesting devices, in accordance with aspects in the present invention. In particular, FIGS. 1A-B illustrate an example embodiment using a counterbalance bar, where FIG. 1A illustrates a side view of an example energy harvesting device using a weighted bar, and FIG. 1B illustrates a top view of an example energy harvesting device using a weighted bar. FIGS. 1C-D illustrate a second example embodiment using discrete weights, where FIG. 1C illustrates a side view of an example energy harvesting device using a multitude of weights, and FIG. 1D illustrates a top view of an example energy harvesting device using a multitude of weights.

As shown in FIGS. 1A-B, the energy harvesting device includes a core 102, a N-S magnet 104, a S-N magnet 106, a counter balance bar 108 and a multitude of magnetic field lines 130, 132, 134, 136, 138 and 140. Core 102 further includes an insulator 110, a conductive winding 112, a ferrite arm 114, a ferrite portion 116, a ferrite arm 118, a ferrite arm 120, a ferrite portion 122 and a ferrite arm 124.

A second embodiment, shown in FIGS. 1C-D, does not include counter balance bar 108, but includes a counter balance bar 126 and a counter balance bar 128.

The two embodiments shown in FIGS. 1A-D are arranged and operate similarly. Further discussion will be limited to the embodiment presented in FIGS. 1A-B.

Core 102 is disposed laterally between N-S magnet 104 and S-N magnet 106. Core 102 is disposed sufficiently above each of N-S magnet 104 and S-N magnet 106 such that in a rest state as shown in FIG. 1A, ferrite arm 124 is disposed minimally above S-N magnet 106. Such minimal displacement of ferrite arm 124 with respect to S-N magnet 106 minimizes the overall cross-sectional height of the energy harvesting device. Insulator 110 is disposed at the center of core 102, and disposed between and parallel to ferrite portion 116 and ferrite portion 122. Ferrite arm 114 is oriented perpendicularly to and jointed to ferrite portion 116 and insulator 110. Ferrite arm 118 is oriented perpendicularly to and jointed to ferrite portion 116 and insulator 110. Ferrite arm 120 is oriented perpendicularly to and jointed to ferrite portion 122 and insulator 110. Ferrite arm 124 is oriented perpendicularly to and jointed to ferrite portion 122 and insulator 110. Counter balance bar 108 is disposed adjacent and connected to ferrite arm 120 and ferrite arm 124, and parallel to insulator 110. Conductive winding 112 is oriented concentrically around the insulator 110, ferrite portion 116 and ferrite portion 122.

Insulator 110 is an electrically non-conductive material, non-limiting examples of which include a ceramic material.

Core 102 rests such that ferrite arm 120, ferrite portion 122 and ferrite arm 124 are disposed around S-N magnet 106. Core 102 may be supported by any known system or device (not shown) that enables rotational movement, yet prevents lateral movement in an x-y direction. Non-limiting examples of such support include rotational bearings and bushings. Core 102 is rotated due to the counterbalance bar 108 or the combined counter balance bar 126 and counter balance bar 128.

Ferrite portion 116 and ferrite portion 122 are disposed about insulator 110.

N-S magnet 104 is oriented such that magnetic field line 134 exits plane 144, encircles N-S magnet 104 along magnetic field line 130, and re-enters N-S magnet 104 at plane 142. S-N magnet 106 is positioned with the opposite polar orientation of N-S magnet 104, and with magnetic field line 136, magnetic field line 138 and magnetic field line 140 in opposite orientation of respective lines around N-S magnet 104.

Magnetic field line 132 is concentrated in ferrite arm 114, ferrite portion 116 and ferrite arm 118. Magnetic field line 138 is concentrated in ferrite arm 120, ferrite portion 122 and ferrite arm 124.

In operation, core 102 is initially not level with reference to N-S magnet 104 and S-N magnet 106 as a result of balance bar 108. Core 102 may oscillate in a clockwise and counter-clockwise direction. When there is no vibration or generalized motion of the energy harvesting device, core 102 remains stable, such that ferrite arm 124 is lower than ferrite arm 118. Because there is no motion of core 102, the strength of magnetic field line 132 through ferrite portion 116 and magnetic field line 138 through ferrite portion 122 remain constant and thus no electricity is generated.

A more detailed discussion of the energy harvesting device undergoing clockwise rotation presented in FIGS. 1A-B will now be described with additional reference to FIGS. 2A-D.

Figure 2A:
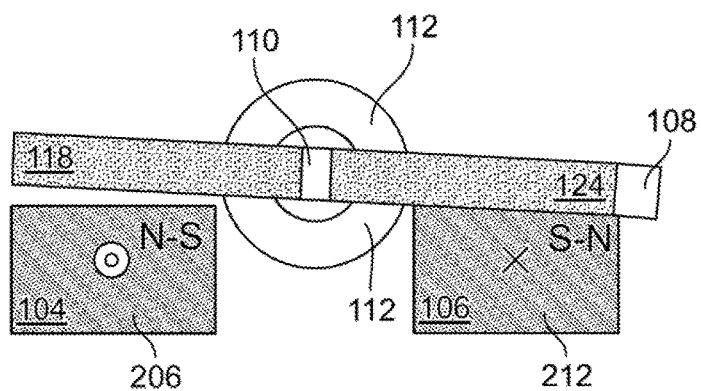
FIGS. 2A-D illustrate the magnetic field lines of the example energy harvesting device in FIGS. 1A-B, where
Figure 2B:
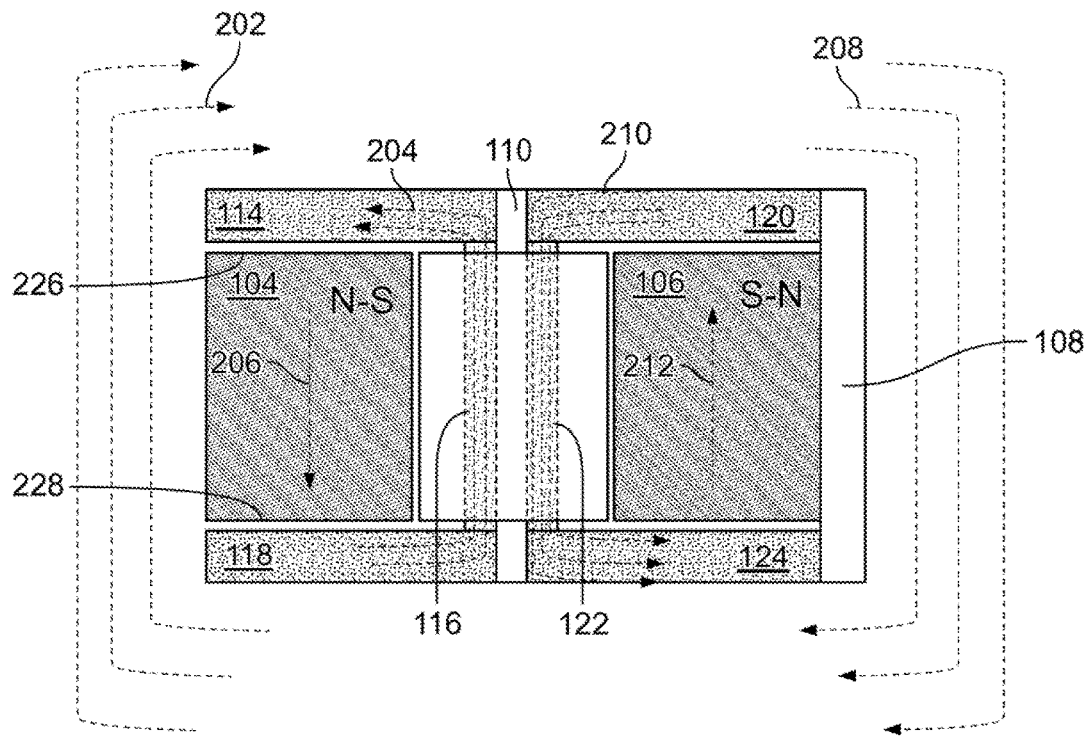
Figure 2C:
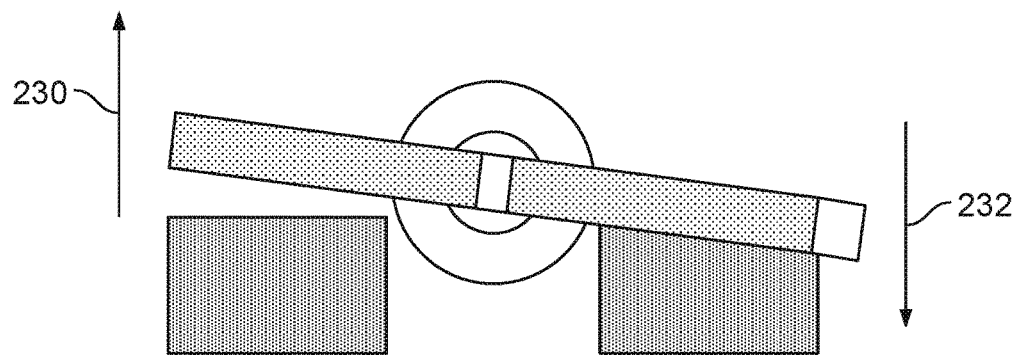
Figure 2D:
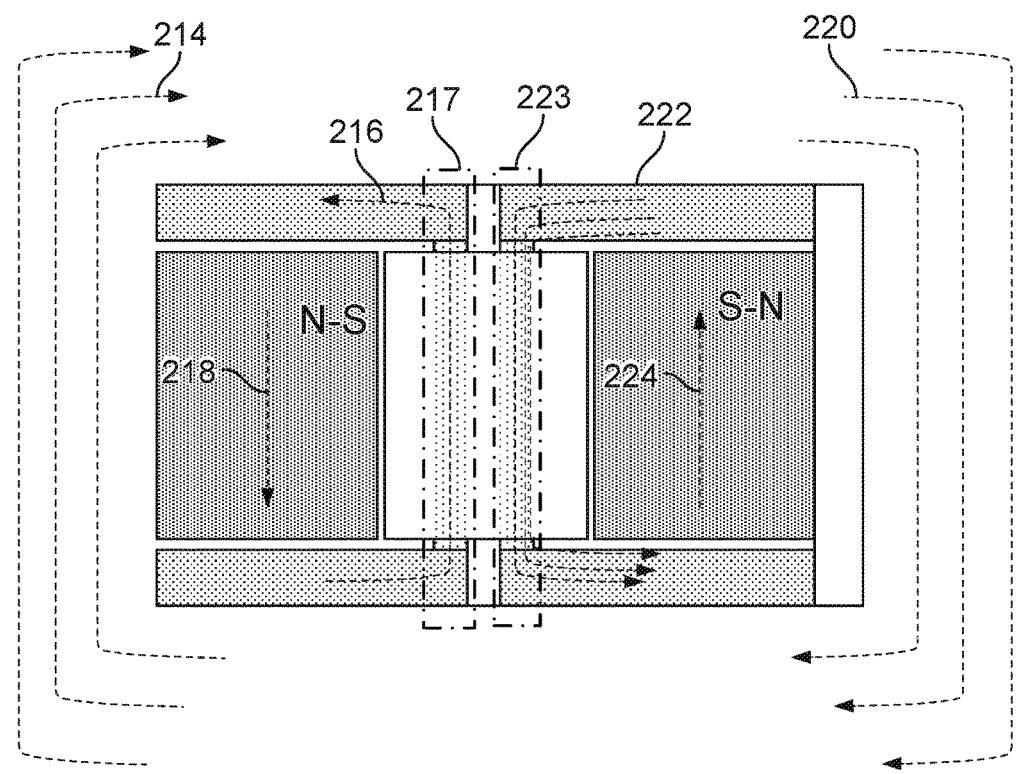

FIGS. 2A-D illustrate the magnetic field lines of the example energy harvesting device in FIGS. 1A-B. In particular, FIG. 2A and FIG. 2B illustrate a side and top view, respectively, of an example energy harvesting device at a resting state, whereas FIG. 2C and FIG. 2D illustrate a side and top view, respectively, of an example energy harvesting device at a position rotated about insulator 110 in the direction represented by arrow 230 and arrow 232.

As shown in the figures, the energy harvesting device further includes a multitude of magnetic field densities 202, 204, 206, 208, 210, 212, 214, 216, 218, 220, 222 and 224. As shown in FIG. 2D, a portion 223 of the magnetic field lines from the S-N magnet 106 within the core 102 has a greater magnetic field density than a portion 217 of the magnetic field lines within the core 102 from the N-S magnet 104. As shown in FIG. 3D, a portion 323 of the magnetic field lines from the S-N magnet 106 within the core 102 has a lesser magnetic field density than a portion 317 of the magnetic field lines within the core 102 from the N-S magnet 104.

N-S magnet 104 is oriented such that magnetic field density 206 exits plane 228, encircles N-S magnet 104 along magnetic field density 202, and re-enters N-S magnet 104 at plane 226.

S-N magnet 106 is positioned with the opposite polar orientation of N-S magnet 104, and with magnetic field density 208, magnetic field density 210, magnetic field density 212, magnetic field density 220, magnetic field density 222 and magnetic field density 224 in opposite orientation of respective lines around N-S magnet 104.

Magnetic field density 204 is concentrated in ferrite arm 114, ferrite portion 116 and ferrite arm 118. Magnetic field density 210 is concentrated in ferrite arm 120, ferrite portion 122 and ferrite arm 124.

Similarly, magnetic field density 216 is concentrated in ferrite arm 114, ferrite portion 116 and ferrite arm 118. Magnetic field density 222 is concentrated in ferrite arm 120, ferrite portion 122 and ferrite arm 124.

The number of field lines represents magnetic field strength. As a result, magnetic field density 204 represents a weaker field than magnetic field density 210, while magnetic field density 216 is weaker than magnetic field density 222. Similarly, magnetic field density 210 is weaker than magnetic field density 222, and magnetic field density 204 is stronger than magnetic field density 216. Magnetic field density 206, magnetic field density 212, magnetic field density 218 and magnetic field density 224 are constant.

In operation, the energy harvesting device will be disposed in a housing, as will be discussed in more detail below with reference to FIGS. 5A-B. The housing will permit limited clockwise and counter-clockwise rotation of core 102. When the housing, which houses the energy harvesting device, experiences motion, core 102 will experience a limited rotation. Non-limiting examples of motion could be mechanical vibration, rocking, or displacement in a vertical, horizontal or diagonal direction. Core 102 is free to rotate by an amount limited by the size of the housing. Counter balance bar 108 initially resists movement, resulting in a change of inertia resulting from movement of the energy harvesting device.

With reference to FIGS. 2A-B, core 102 is rotated such that ferrite arm 120, ferrite portion 122 and ferrite arm 124 are disposed around S-N magnet 106 due to counter balance bar 108 at rest. When the energy harvesting device is displaced due to some form of motion, core 102 may rotate clockwise (in the direction of arrows 230 and 232), as demonstrated in FIGS. 2C-D. This rotation changes the relative locations of ferrite arm 120, ferrite portion 122 and ferrite arm 124 around S-N magnet 106.

As ferrite arm 120, ferrite portion 122 and ferrite arm 124 are displaced closer to S-N magnet 106, the magnetic field density changes (in this case increases), as demonstrated by the increasing number of lines from magnetic field density 210 to magnetic field density 222. Similarly, as ferrite arm 114, ferrite portion 116, and ferrite arm 118 are displaced further away from N-S magnet 104, the magnetic field density decreases, as demonstrated by the decreasing number of lines from magnetic field density 204 to magnetic field density 216.

A change in the magnetic field lines through core 102 results in an electrical current having a polarity in conductive winding 112.

For purposes of discussion, consider the disposition of core 102 as shown in FIG. 2C to be a first disposition. This first disposition has an associated amount of magnetic field lines through core 102 as a result of the relative position of core 102 with respect to N-S magnet 104 and S-N magnet 106.

The total rotation of core 102 is limited to a housing (not shown). In any event, as a result of outside vibrations, core 102 will eventually start to move in a counter clockwise rotation.

A more detailed discussion of the energy harvesting device undergoing counter-clockwise rotation from the at-rest position presented in FIGS. 1A-B will now be described with additional reference to FIGS. 3A-D.

Figure 3A:
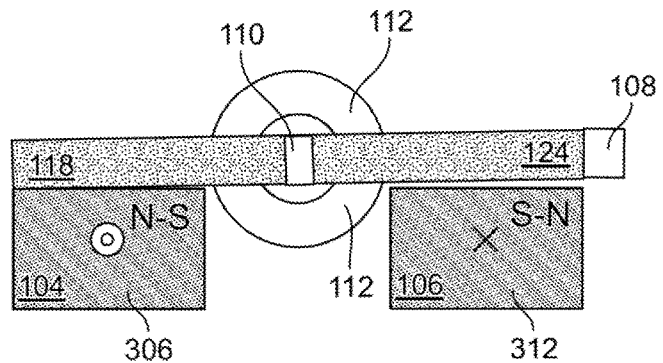
FIGS. 3A-D illustrate the magnetic field lines of the example energy harvesting device in a position rotated about a central axis from FIGS. 2A-D, where
Figure 3B:
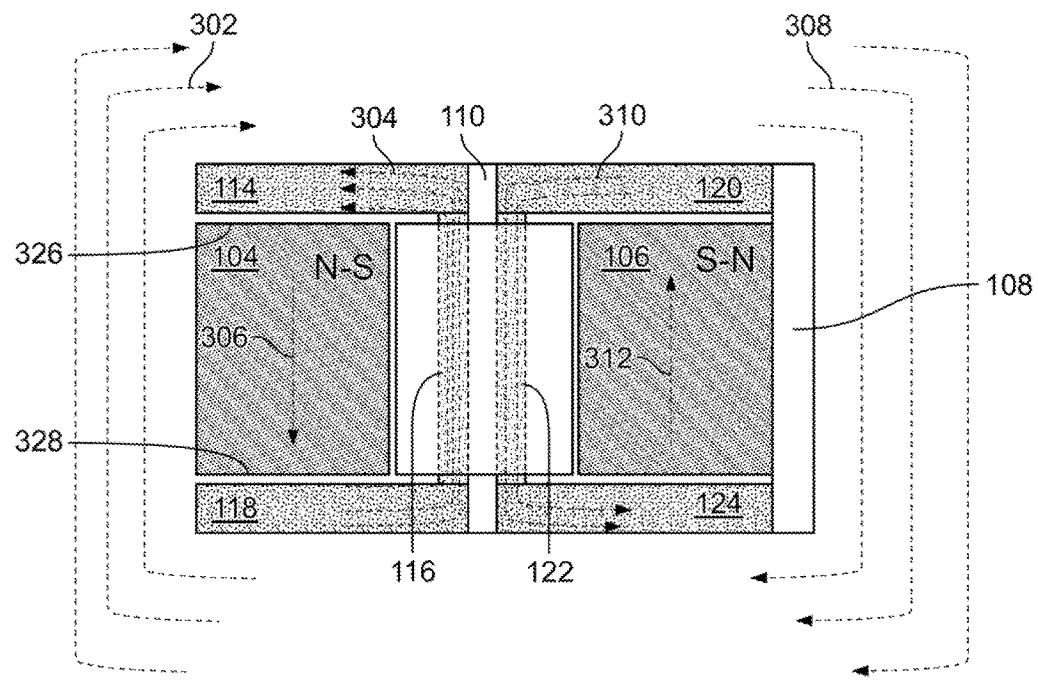
Figure 3C:
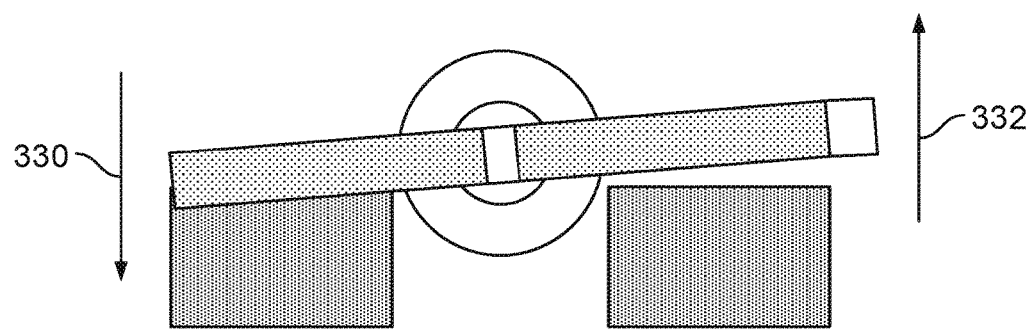
Figure 3D:
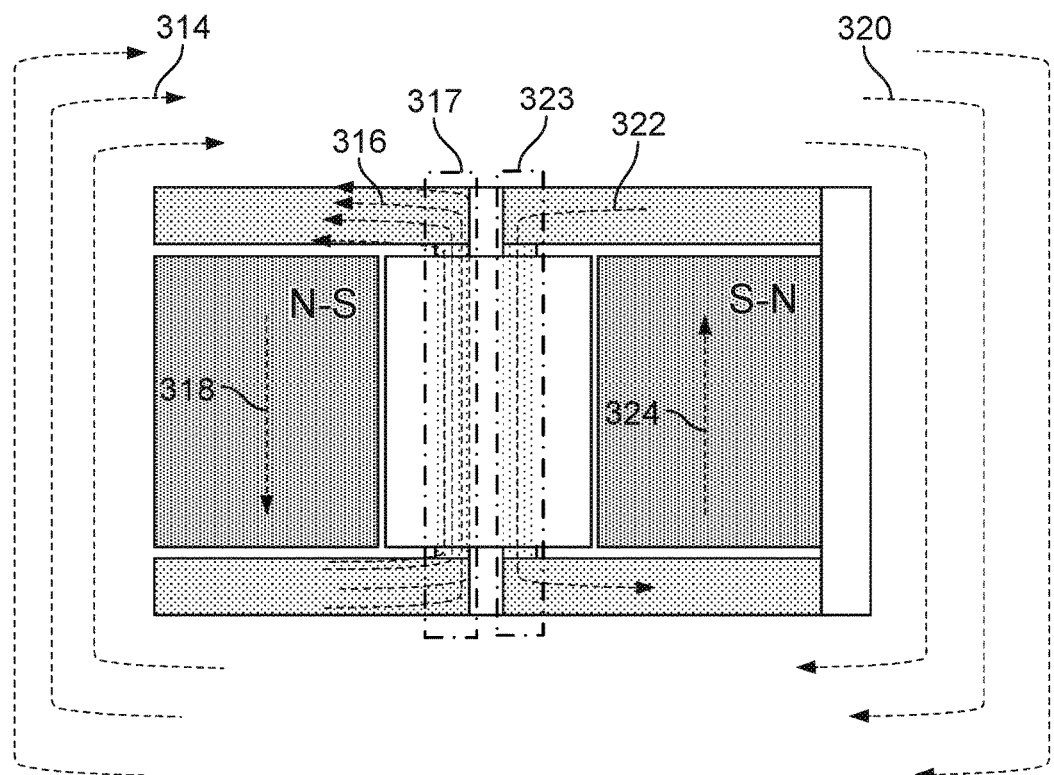

FIGS. 3A-D illustrate the magnetic field lines of the example energy harvesting device in a position rotated about a central axis from FIGS. 2A-D. In particular, FIG. 3A and FIG. 3B illustrate a side and top view, respectively, of an example energy harvesting device, whereas FIG. 3C and FIG. 3D illustrate a side and top view, respectively, of an example energy harvesting device at a position rotated about insulator 110 in the direction represented by arrow 320 and arrow 323.

As shown in the figures, the energy harvesting device further includes a multitude of magnetic field densities 302, 304, 306, 308, 310, 312, 314, 316, 318, 320, 322 and 324.

N-S magnet 104 is oriented such that magnetic field density 306 exits plane 328, encircles N-S magnet 104 along magnetic field density 302, and re-enters N-S magnet 104 at plane 326.

S-N magnet 106 is positioned with the opposite polar orientation of N-S magnet 104, and with magnetic field density 308, magnetic field density 310, magnetic field density 312, magnetic field density 320, magnetic field density 322 and magnetic field density 324 in opposite orientation of respective lines around N-S magnet 104.

Magnetic field density 304 is concentrated in ferrite arm 114, ferrite portion 116 and ferrite arm 118. Magnetic field density 310 is concentrated in ferrite arm 120, ferrite portion 122 and ferrite arm 124.

Similarly, magnetic field density 316 is concentrated in ferrite arm 114, ferrite portion 116 and ferrite arm 118. Magnetic field density 322 is concentrated in ferrite arm 120, ferrite portion 122 and ferrite arm 124.

The number of field lines represents magnetic field strength. As a result, magnetic field density 304 represents a stronger field than magnetic field density 310, while magnetic field density 316 is stronger than magnetic field density 322. Similarly, magnetic field density 310 is stronger than magnetic field density 322, and magnetic field density 304 is weaker than magnetic field density 316. Magnetic field density 306, magnetic field density 312, magnetic field density 318 and magnetic field density 324 are constant.

In operation, the energy harvesting device experiences rotation of core 102 when there is motion.

With reference to FIGS. 3A-B, core 102 is rotated such that ferrite arm 114, ferrite portion 116 and ferrite arm 118 are disposed around N-S magnet 104. This is in contrast to the at-rest position demonstrated in FIGS. 2A-B. When the energy harvesting device is displaced due to some form of motion, core 102 may rotate counter-clockwise (in the direction of arrows 330 and 332), as demonstrated in FIGS. 3C-D. This rotation changes the relative locations of ferrite arm 114, ferrite portion 116 and ferrite arm 118 around N-S magnet 104.

As ferrite arm 114, ferrite portion 116 and ferrite arm 118 are displaced closer to N-S magnet 104, the magnetic field density increases, as demonstrated by the increasing number of lines from magnetic field density 304 to magnetic field density 216, as shown in FIG. 2D. Similarly, as ferrite arm 120, ferrite portion 122, and ferrite arm 124 are displaced further away from S-N magnet 106, the magnetic field density decreases, as demonstrated by the decreasing number of lines from magnetic field density 310 to magnetic field density 322.

It should be noted that core 102 may smoothly rotate between a disposition such as shown in FIG. 2C to a disposition as sown in FIG. 3C. For purposes of discussion, consider the disposition of core 102 as shown in FIG. 3C to be a second disposition. This second disposition has an associated amount of magnetic field lines through core 102 as a result of the relative position of core 102 with respect to N-S magnet 104 and S-N magnet 106.

This change in the magnetic field lines through core 102 is opposite to the change in magnetic field lines discussed above with reference to FIGS. 2C-D. Accordingly, this change in the magnetic field lines results in an electrical current having a polarity in conductive winding 112, that is opposite to the polarity discussed above with reference to FIGS. 2C-D.

Figure 4A:
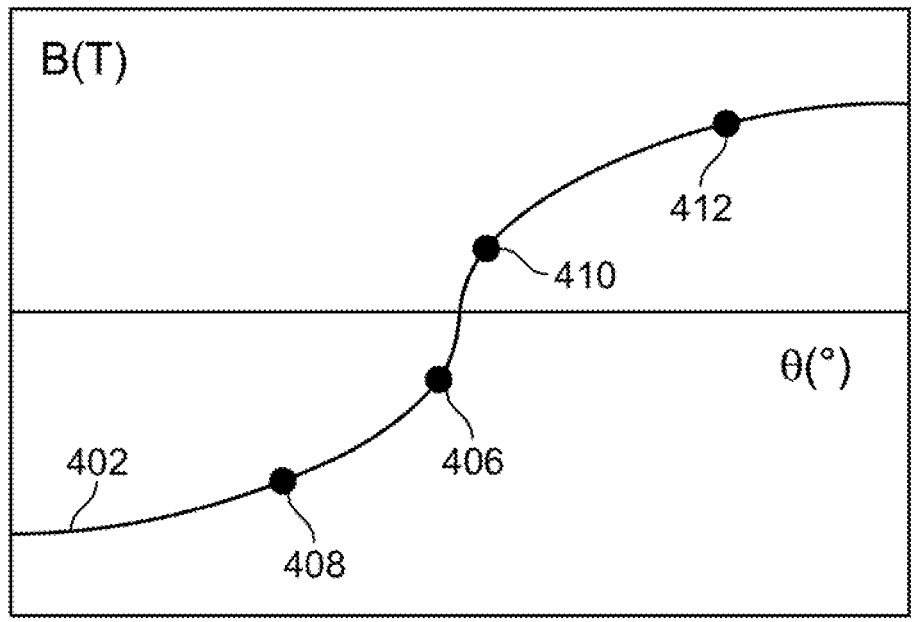
FIGS. 4A-B illustrate parameters affected by the rotation of the energy harvesting device, where
Figure 4B:
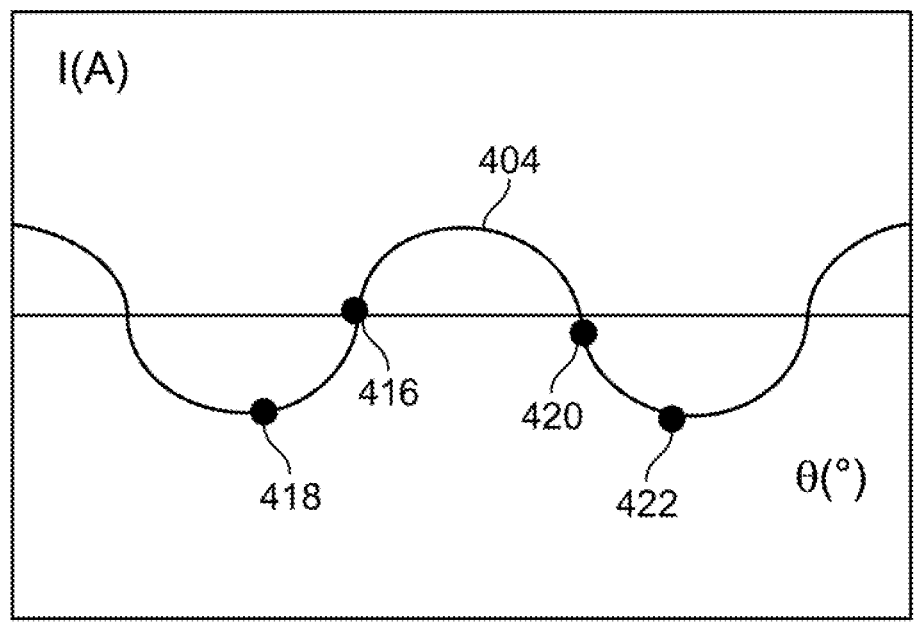

Specifics of the example embodiment presented in FIGS. 2-3 will now be further described with regard to parameters functionally dependent on rotation, with reference to FIGS. 4A-B.

FIGS. 4A-B illustrate parameters affected by the rotation of the energy harvesting device. In particular, FIG. 4A illustrates the magnetic field as a function of angle of rotation, whereas FIG. 4B illustrates the output current as a function of angle of rotation.

As shown in the figures, magnetic field 402 and current 404 are related to the degree of rotation of core 102.

In operation, and returning to FIGS. 2A-B, when core 102 is at rest, magnetic field density 204 is a constant through ferrite portion 116. Returning to FIGS. 4A-B, this is represented by points 406 and 416.

Returning to FIGS. 2A-B, when vibration occurs, core 102 rotates clockwise and generates a magnetic flux through ferrite portion 116 and ferrite portion 122, generating a current in conductive winding 112. Returning to FIGS. 4A-B, the magnetic field and current are represented by points 408 and 418.

The change in position of ferrite portion 122 results in an increasing magnitude of magnetic field from S-N magnet 106. The change in magnetic field strength generates an induced current in conductive winding 112.

Alternatively, returning to FIGS. 2A-B, core 102 rotates counter-clockwise it generates an increasing magnetic flux through ferrite portion 116. Returning to FIGS. 4A-B, this is represented by points 410 and 420.

Returning to FIGS. 2A-B, core 102 rotates further counter-clockwise it continues to increase in magnetic field strength through ferrite portion 116. Returning to FIGS. 4A-B, this is represented by points 412 and 422.

The change in position of ferrite portion 116 results in an increasing magnitude of magnetic field from N-S magnet 104. The change in magnetic field strength generates an induced current in conductive winding 112.

With vibration and assisted by counter balance bar 108, core 102 undergoes oscillatory motion, clockwise to counter-clockwise to clockwise. In doing so, the magnet field strength is continuously changing, continuously inducing a current in conductive winding 112.

Figure 5A:
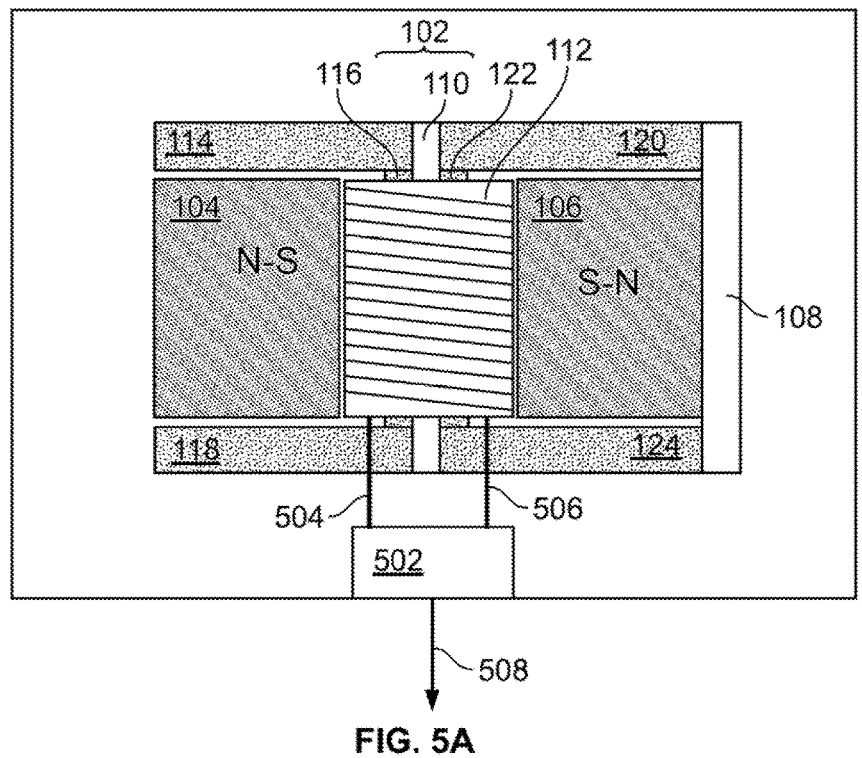
FIGS. 5A-B illustrate an example energy harvesting device configured to output a current, where
Figure 5B:
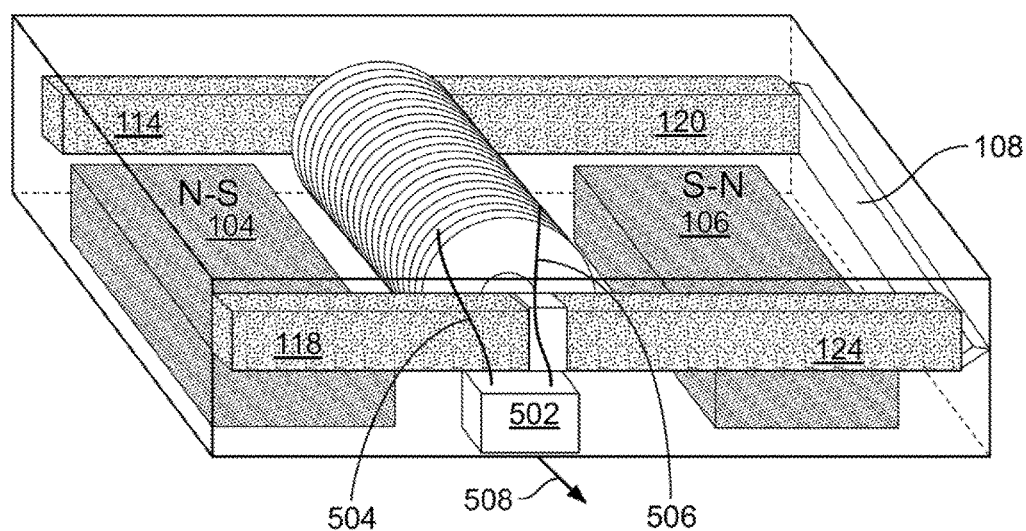

Specifics of the example embodiment presented in FIGS. 1A-B will now be further described in a configuration to enable energy capturing and output, with reference to FIGS. 5A-B.

FIGS. 5A-B illustrate an example energy harvesting device configured to output a current. In particular, FIG. 5A illustrates a top view, whereas FIG. 5B illustrates an oblique view.

As shown in the figures, the energy harvesting device includes the energy harvesting device described in FIGS. 1A-B within a housing, an output component 502, an entry wire 504, an exit wire 506 and an output 508.

Entry wire 504 connects conductive winding 112 to output component 502. Exit wire 506 connects conductive winding 112 to output component 502. Output 508 connects output component 502 to an external device (not shown). Entry wire 504, exit wire 506 and output 508 form a conductive circuit, wherein current formed by the induced magnetic fields in core 102 may be output from the energy harvesting device.

Entry wire 504 and exit coiling 530 are used to transmit electrical current between conductive winding 112 and output component 502.

Output 508 transmits generated current to the external device. Non-limiting examples of external devices include energy storage such as batteries or capacitor, or active devices. The housing may be mounted to a surface that exhibits motion from which the energy harvesting device may harvest energy.

In operation, the energy harvesting device of FIGS. 5A-B is used to collect and output energy to an external device.

As described with reference to FIGS. 4A-B, when the housing is disposed on a surface that moves, energy harvesting device therein will oscillate. The oscillatory motion of core 102 generates an output current from conductive winding 112. Entry wire 504 serves as the entry to the generation circuit, while exit wire 506 serves as the exit for generated current. Output 502 can then provide an output current or voltage that can be captured in an external device.

The embodiments discussed with reference to FIGS. 1-5 are non-limiting in nature and in accordance with the present invention. Additional example embodiments in accordance with the present invention include presence absence of insulation, as well as different arrangements of the core and permanent magnets. These will be discussed in more detail with reference to FIGS. 6-8.

Specifics of an example energy harvesting devices without an insulator will now be described with reference to FIGS. 6A-B.

Figure 6A:
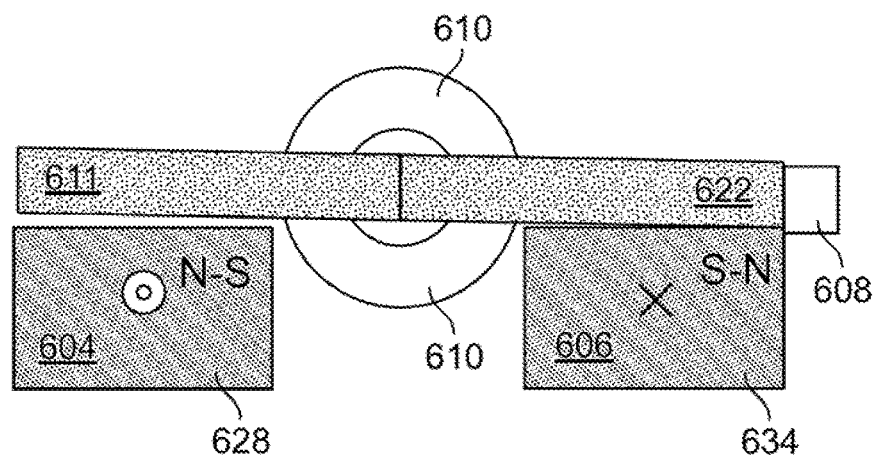
FIGS. 6A-B illustrate an additional embodiment of an energy harvesting device, where particular.
Figure 6B:
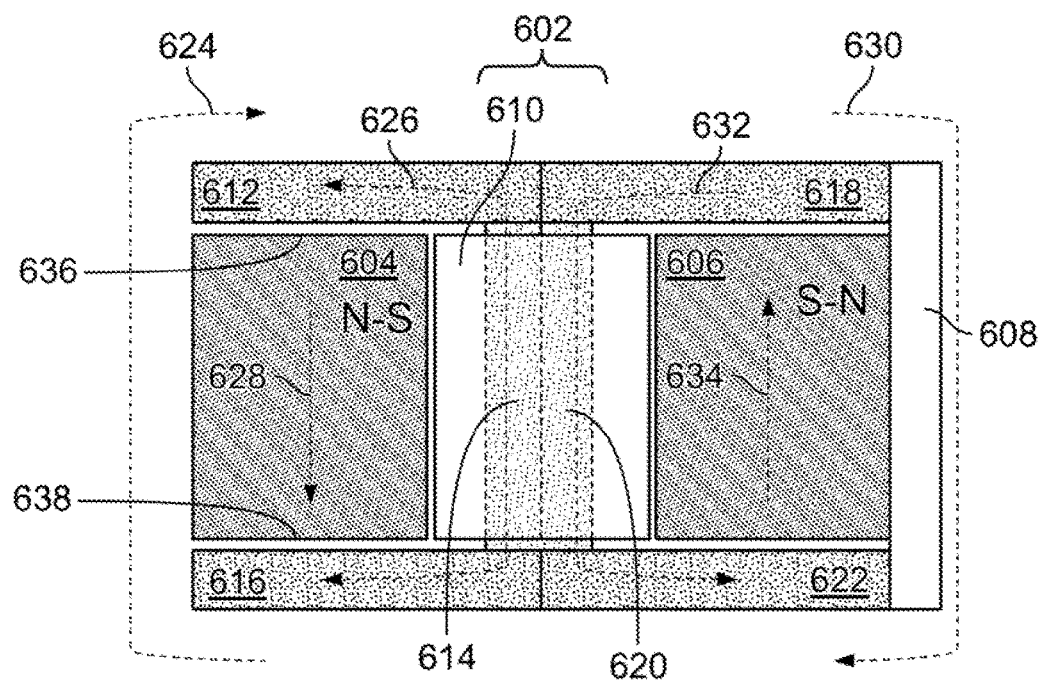

FIGS. 6A-B illustrate an additional embodiment of an energy harvesting device. In particular, FIG. 6A illustrates a side view of an example energy harvesting device, whereas FIG. 6B illustrates a top view of an example energy harvesting device.

As shown in the figures, energy harvesting device of FIGS. 6A-B includes a core 602, a N-S magnet 604, a S-N magnet 606, a counter balance bar 608 and a multitude of magnetic field lines 624, 626, 628, 630, 632, and 634. Core 602 further includes a conductive winding 610, a ferrite arm 612, a ferrite 614, a ferrite arm 616, a ferrite arm 618, a ferrite 620 and a ferrite arm 622.

Core 602 is disposed laterally between N-S magnet 604 and S-N magnet 606. Ferrite arm 612 is oriented perpendicularly to and jointed to ferrite 614. Ferrite arm 616 is oriented perpendicularly to and jointed to ferrite 614. Ferrite arm 618 is oriented perpendicularly to and jointed to ferrite 620. Ferrite arm 622 is oriented perpendicularly to and jointed to ferrite 620. Counter balance bar 108 is disposed adjacent and connected to ferrite arm 618 and ferrite arm 622. Conductive winding 610 is oriented concentrically around ferrite 614 and ferrite 620.

N-S magnet 604 is oriented such that magnetic field line 628 exits plane 638, encircles N-S magnet 604 along magnetic field line 624, and re-enters N-S magnet 604 at plane 636.

S-N magnet 606 is positioned with the opposite polar orientation of N-S magnet 604, and with magnetic field density 630, magnetic field density 632 and magnetic field density 634 in opposite orientation of respective densities around N-S magnet 604.

Magnetic field line 626 is concentrated in ferrite arm 612, ferrite 614 and ferrite arm 616. Magnetic field line 632 is concentrated in ferrite arm 618, ferrite 620 and ferrite arm 622.

Core 602 rests such that ferrite arm 618, ferrite 620 and ferrite arm 622 are disposed around S-N magnet 606. Core 602 is rotated about ferrite 614 and ferrite 620 due to the counterbalance bar 608.

In operation, core 602 is rotated clockwise and ferrite arm 618, ferrite 620 and ferrite arm 622 are disposed around S-N magnet 606 due to counter balance bar 608. When there is no vibration or generalized motion of the energy harvesting device of FIGS. 6A-B, core 602 remains stable and no energy is generated. Because there is no motion of core 602, the strength of magnetic field line 632 through ferrite 620 and magnetic field line 626 through ferrite 614 remain constant.

In the embodiments discussed above with reference to FIGS. 1-3D and 5A-6D, a core includes an H-shape and is used with two magnets. Other embodiments may use different core shapes and a different number of magnets.

Specifics of an example energy harvesting devices utilizing vertical arrangement of magnets will now be described with reference to FIG. 7.

Figure 7:
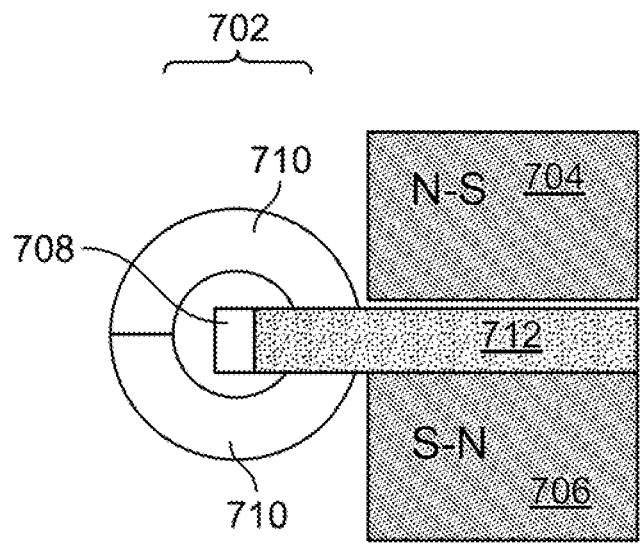
FIG. 7 illustrates an additional embodiment of an energy harvesting device.

FIG. 7 illustrates an additional embodiment of an energy harvesting device.

As shown in the figure, the energy harvesting device includes a core 702, a N-S magnet 704 and a S-N magnet 706. Core 702 further includes an insulator 708, a conductive winding 710 and a ferrite 712.

Core 702 is disposed vertically between N-S magnet 704 and S-N magnet 706. Insulator 708 is disposed at the center of core 702, and disposed adjacent and connected to ferrite 712. Conductive winding 710 is oriented concentrically around the insulator 708 and ferrite 712.

Core 702 rests such that ferrite 712 is disposed around S-N magnet 706. Core 702 is rotated about ferrite 712 due to the weight of ferrite 712.

In operation, when there is no vibration or generalized motion of the energy harvesting device of FIG. 7, core 702 remains stable and no energy is generated. Because there is no motion of core 702, the strength of the magnetic field through ferrite components is stable. With motion, core 702 will rotate and ferrite 712 will alternate in proximity between S-N magnet 706 and N-S magnet 704. As strength and polarity of the magnetic field alternates in ferrite 712, current is generated within conductive winding 710 and can output current similarly to an energy harvesting device as discussed above with reference to any one of FIGS. 1-3D and 5A-6D.

In the embodiment of FIG. 7, core 702 has a C-shape.

Specifics of an example energy harvesting devices utilizing four magnets will now be described with reference to FIG. 8.

Figure 8:
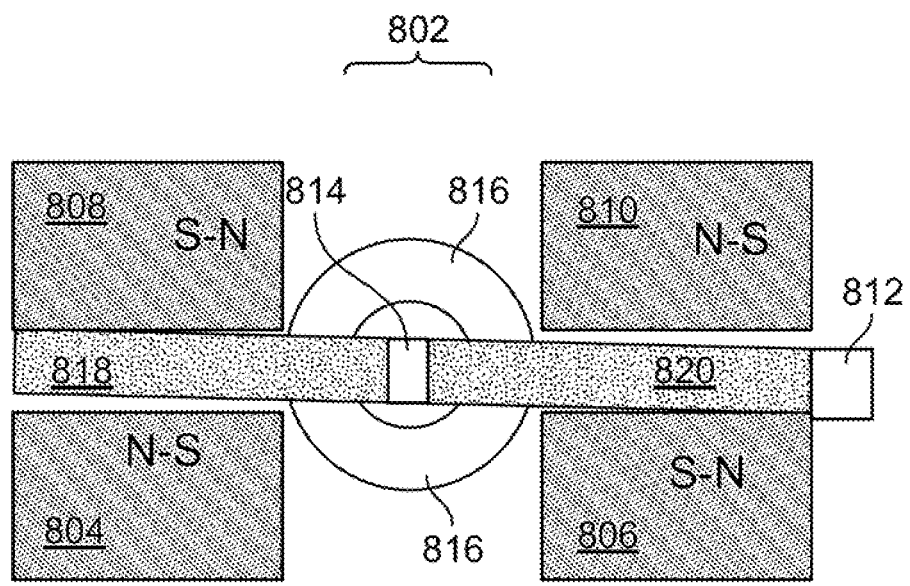
FIG. 8 illustrates an additional embodiment of an energy harvesting device.

FIG. 8 illustrates an additional embodiment of an energy harvesting device.

As shown in the figure, the energy harvesting device includes a core 802, a N-S magnet 804, a S-N magnet 806, a S-N magnet 808, a N-S magnet 810 and a counter balance bar 812. Core 802 further includes an insulator 814, a conductive winding 816, a ferrite 818 and a ferrite 820.

Core 802 is disposed vertically between N-S magnet 804 and S-N magnet 808. Core 802 is further disposed vertically between N-S magnet 810 and S-N magnet 808. Core 802 is disposed horizontally between N-S magnet 804 and S-N magnet 806. Core 802 is further disposed horizontally between N-S magnet 810 and S-N magnet 808. Insulator 814 is disposed at the center of core 802, and disposed between and parallel to ferrite 818 and ferrite 820. Counter balance bar 812 is disposed adjacent and connected to ferrite 820, and parallel to insulator 814. Conductive winding 816 is oriented concentrically around the insulator 814, ferrite 818 and ferrite 820.

Core 802 is rotated about ferrite 814 due to the counterbalance bar 812.

Core 802 rests such that ferrite 820 is disposed around S-N magnet 806. Similarly, core 802 rests such that ferrite 818 is disposed around S-N magnet 808.

In operation, when there is no vibration or generalized motion of the energy harvesting device of FIG. 8, core 802 remains stable and no energy is generated. Because there is no motion of core 802, the strength of the magnetic field through ferrite components is stable. With motion, core 802 will rotate and ferrite 818 will alternate in proximity between S-N magnet 808 and N-S magnet 804. Similarly, ferrite 820 will alternate in proximity between S-N magnet 806 and N-S magnet 810. As strength and polarity of the magnetic field alternates in ferrite 818 and ferrite 820, current is generated within conductive winding 816 and can output current similarly to an energy harvesting device as discussed above with reference to any one of FIGS. 1-3D, 5A-6D and 7.

In the embodiment of FIG. 8, core 802 has an H-shape, but is used with four magnets.

In summary, the described invention provides a method to harvest energy. The low-profile device can generate energy resulting from device motion and output it to a variety of devices, such as a battery for energy storage. Non-limiting examples of motion could include bridge vibration resulting from traffic. The current disclosure includes several embodiments utilizing similar principles that could allow for applications to a variety of situations and motion types.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. An energy harvesting device comprising:
   a core portion having an electrical output and being operable to move from a first disposition to a second disposition;
   a first magnet disposed to provide first magnetic field lines therethrough in a first direction; and
   a second magnet disposed to provide second magnetic field lines therethrough in a second direction,
   wherein said core portion, said first magnet and said second magnet are arranged such that externally applied vibrations in a third direction normal to the first direction cause said core portion to oscillate between the first disposition and the second disposition,
   wherein when traveling from the second disposition to the first disposition, said electrical output is operable to output a first current so as to have a first polarity based on magnetic field lines from a first portion of the first magnetic field lines and a first portion of the second magnetic field lines, the first portion of the first magnetic field lines being greater than the first portion of the second magnetic field lines, and
   wherein when traveling from the first disposition to the second disposition, said electrical output is operable to output the first current so as to have a second polarity based on magnetic field lines from a second portion of the first magnetic field lines and a second portion of the second magnetic field lines, the second portion of the first magnetic field lines being less than the second portion of the second magnetic field lines.

2. The energy harvesting device of claim 1, wherein said core portion comprises:
   a ferrite core; and
   a conducting winding wrapped around said ferrite core.

3. The energy harvesting device of claim 2, wherein said core portion further comprises:
   a first ferrite arm; and
   a second ferrite arm,
   wherein said ferrite core has a first end separated from a second end along a longitudinal axis that is parallel with the first direction,
   wherein said first ferrite arm is disposed at said first end so as to be perpendicular to the longitudinal axis, and
   wherein said second ferrite arm is disposed at said second end so as to be perpendicular to the longitudinal axis.

4. The energy harvesting device of claim 3, wherein said core portion is disposed between said first magnet and said second magnet.

5. The energy harvesting device of claim 4, wherein said core portion is arranged to be non-centrally disposed between the first disposition and the second disposition in the absence of externally applied vibrations in the third direction normal to the first direction.

6. The energy harvesting device of claim 1, wherein said core portion is disposed between said first magnet and said second magnet.

7. The energy harvesting device of claim 6, wherein said core portion is arranged to be non-centrally disposed between the first disposition and the second disposition in the absence of externally applied vibrations in the third direction normal to the first direction.

8. The energy harvesting device of claim 1, wherein said core portion is arranged to be non-centrally disposed between the first disposition and the second disposition in the absence of externally applied vibrations in the third direction normal to the first direction.

9. A method of harvesting energy, said method comprising:
- a core portion having an electrical output and being operable to move from a first disposition to a second disposition;
- a first magnet disposed to provide first magnetic field lines therethrough in a first direction; and
- a second magnet disposed to provide second magnetic field lines therethrough in a second direction,
- wherein said core portion, said first magnet and said second magnet are arranged such that externally applied vibrations in a third direction normal to the first direction cause said core portion to oscillate between the first disposition and the second disposition,
- wherein when traveling from the second disposition to the first disposition, said electrical output is operable to output a first current so as to have a first polarity based on magnetic field lines from a first portion of the first magnetic field lines and a first portion of the second magnetic field lines, the first portion of the first magnetic field lines being greater than the first portion of the second magnetic field lines, and
- wherein when traveling from the first disposition to the second disposition, said electrical output is operable to output the first current so as to have a second polarity based on magnetic field lines from a second portion of the first magnetic field lines and a second portion of the second magnetic field lines, the second portion of the first magnetic field lines being less than the second portion of the second magnetic field lines.

10. The method of claim 9, wherein said core portion comprises:
- a ferrite core; and
- a conducting wire wrapped around said ferrite core.

11. The method of claim 10, wherein said core portion further comprises:
- a first ferrite arm; and
- a second ferrite arm,
- wherein said ferrite core has a first end separated from a second end along a longitudinal axis that is parallel with the first direction,
- wherein said first ferrite arm is disposed at said first end so as to be perpendicular to the longitudinal axis, and
- wherein said second ferrite arm is disposed at said second end so as to be perpendicular to the longitudinal axis.

12. The method of claim 11, wherein said core portion is disposed between said first magnet and said second magnet.

13. The method of claim 12, wherein said core portion is arranged to be non-centrally disposed between the first disposition and the second disposition in the absence of externally applied vibrations in the third direction normal to the first direction.

14. An energy harvesting device for use on a surface operable to apply vibrations in a direction normal to the surface, said energy harvesting device comprising:
- a housing having a bottom and an output port; and
- an energy harvesting component disposed on said bottom and within said housing, said energy harvesting component operable to output current to said output port, said energy harvesting component including:
  - a core portion having an electrical output and being operable to move from a first disposition to a second disposition;
  - a first magnet disposed to provide first magnetic field lines therethrough in a first direction; and
  - a second magnet disposed to provide second magnetic field lines therethrough in a second direction,
  - wherein said core portion, said first magnet and said second magnet are arranged such that externally applied vibrations in a third direction normal to the first direction cause said core portion to oscillate between the first disposition and the second disposition,
  - wherein when traveling from the second disposition to the first disposition, said electrical output is operable to output a first current so as to have a first polarity based on magnetic field lines from a first portion of the first magnetic field lines and a first portion of the second magnetic field lines, the first portion of the first magnetic field lines being greater than the first portion of the second magnetic field lines, and
  - wherein when traveling from the first disposition to the second disposition, said electrical output is operable to output the first current so as to have a second polarity based on magnetic field lines from a second portion of the first magnetic field lines and a second portion of the second magnetic field lines, the second portion of the first magnetic field lines being less than the second portion of the second magnetic field lines.

15. The energy harvesting device of claim 14, wherein said core portion comprises:
- a ferrite core; and
- a conducting wire wrapped around said ferrite core.

* * * * *